US012684017B2

(12) United States Patent　　　　　(10) Patent No.:　US 12,684,017 B2
Vittal et al.　　　　　　　　　　　　(45) Date of Patent:　　Jul. 14, 2026

(54) AUTOMATED GENERATION OF OBJECTS FOR KUBERNETES SERVICES

(71) Applicant: Citrix Systems, Inc., Fort Lauderdale, FL (US)

(72) Inventors: Chiradeep Vittal, Santa Clara, CA (US); Sharvari Mithyantha, Bangalore (IN); Apoorva Kamath, Bangalore (IN); Bharathi M, Bangalore (IN)

( * ) Notice: Subject to any disclaimer, the term of this patent is extended or adjusted under 35 U.S.C. 154(b) by 340 days.

(21) Appl. No.: 17/487,524

(22) Filed: Sep. 28, 2021

(65) Prior Publication Data

US 2023/0108778 A1　　Apr. 6, 2023

(51) Int. Cl.
| | |
|---|---|
| *H04L 12/26* | (2006.01) |
| *G06F 9/455* | (2018.01) |
| *G06F 9/50* | (2006.01) |
| *G06F 9/54* | (2006.01) |
| *G06F 15/16* | (2006.01) |
| *G06F 15/173* | (2006.01) |
| *G06F 16/00* | (2019.01) |
| *G06F 16/27* | (2019.01) |
| *G06F 17/00* | (2019.01) |
| *H04L 9/40* | (2022.01) |
| *H04L 12/751* | (2013.01) |
| *H04L 15/16* | (2006.01) |
| *H04L 29/06* | (2006.01) |
| *H04L 29/08* | (2006.01) |

(52) U.S. Cl.
CPC .......... *H04L 63/20* (2013.01); *G06F 9/45558* (2013.01); *H04L 63/0227* (2013.01); *G06F 2009/45591* (2013.01); *G06F 2009/45595* (2013.01)

(58) Field of Classification Search
CPC . H04L 63/20; H04L 63/0227; H04L 63/0236; H04L 63/0263; G06F 9/45558; G06F 2009/45591; G06F 2009/45595; G06F 2009/45562; G06F 9/44505; G06F 21/53; G06F 21/606; G06F 21/62
USPC .............................................. 726/1
See application file for complete search history.

(56) References Cited

U.S. PATENT DOCUMENTS

| | | | |
|---|---|---|---|
| 11,102,076 B1 | 8/2021 | Pieczul et al. | |
| 12,079,242 B2 * | 9/2024 | Banerjee ................. | G06F 16/27 |
| 2019/0052549 A1 * | 2/2019 | Duggal .............. | G06Q 30/0635 |

(Continued)

FOREIGN PATENT DOCUMENTS

| | | | | |
|---|---|---|---|---|
| CN | 111752681 A | * | 6/2020 | ............. H04L 67/51 |

*Primary Examiner* — Berhanu Shitayewoldetadik

(57) ABSTRACT

Methods and systems for automatic generation of Kubernetes objects based on network security policies are described herein. A computing device may receive a template object file. The template object file may comprise a format for a Kubernetes Ingress object and/or a Kubernetes Custom Resource Definition. The template object file may comprise a template identifier. The computing device may receive an indication of a network security policy. The computing device may identify a Kubernetes service object that comprises the template identifier and generate, based on the template object file and based on the network security policy, a new Kubernetes object. The new Kubernetes object may comprise one or both of a new Kubernetes Ingress object for the Kubernetes service object, or a new CRD for the Kubernetes service object. The computing device may store the new Kubernetes object.

17 Claims, 12 Drawing Sheets

(56)            References Cited

U.S. PATENT DOCUMENTS

2019/0158537  A1     5/2019  Miriyala
2021/0218652  A1*    7/2021  Raut ...................... H04L 43/20
2021/0318914  A1*   10/2021  Moyer ............... G06F 16/2282
2023/0079209  A1*    3/2023  Nallamothu ........ H04L 12/4625
                                                                709/238

* cited by examiner

```
apiVersion: extensions/v1beta1 kind: Ingress metadata:

name: template-ingress annotations:

com.organization.ingress: <value> service.organization.com/secret:  : "*-secret"

ingress.organization.com/insecure-port: <value>...

spec:

rules:

- host: "*.example.com"
```

Kubernetes Ingress Template Object
(900)

FIG. 9

```
apiVersion: v1 kind: Service metadata:

name: <service name> annotations:

com.organization.ingress: <value> com.organization.ingress/host: "frontend.co.in"

labels:

...

spec:

...
```

Kubernetes Service Object
(1000)

FIG. 10

```
apiVersion: extensions/v1beta1
kind: Ingress
metadata:
 name: <service name>-ingress
 annotations:
  kubernetes.io/ingress.class: "organization"
  service.organization.com/secret: "<service-name>-secret"
  ...
spec:
 rules:
 - host: frontend.co.in
   http:
    paths:
    - path: /
      backend:
        serviceName: <service-name>
        servicePort: <port>
```

Kubernetes Ingress Object
(1100)

FIG. 11

```
apiVersion: organization.com/v1 kind: rewritepolicy metadata:

name: allowipstemplate annotations:

com.organization.crd: <value> spec:

responder-policies:

...

- servicenames: [ ]
```

Kubernetes Custom Resource Definition Template Object
(1200)

FIG. 12

```
apiVersion: v1 kind: Service metadata:

name: <service name> annotations:

com.organization.crd: <value> labels:

...

spec:

...
```

Kubernetes Service Object
(1300)

FIG. 13

```
apiVersion: organization.com/v1
kind: rewritepolicy
metadata:
  name: allowips-<namespace>
spec:
  responder-policies:
    ...
    - servicenames: [<service name>]
```

Kubernetes Custom Resource Definition
(1400)

FIG. 14

AUTOMATED GENERATION OF OBJECTS FOR KUBERNETES SERVICES

FIELD

Aspects described herein generally relate to computer networking, virtualization, network security, computer application containerization, and hardware and software related thereto. More specifically, one or more aspects describe herein improve the security of Kubernetes services by providing for the automatic generation of Kubernetes objects using templates and based on network security policies.

BACKGROUND

Kubernetes, also known as "k8s" or "kube," is an open source system which allows users to execute and manage containerized applications. More particularly, the Kubernetes system implements various clusters which are configured to receive and execute containerized applications. Those clusters may be implemented on (e.g., executed on) nodes, which may comprise virtual and/or physical machines. Various groups of containerized applications, referred to as pods, might be executed on those clusters. This configuration allows an organization to easily deploy the same application across a wide variety of computing resources. Another advantage to the approach taken by Kubernetes is that it allows organizations to easily ensure service consistency: for example, if a first cluster crashes while executing a pod of various containerized applications, Kubernetes can effectuate the rapid and efficient re-deployment of that cluster by causing a new cluster to execute the same pod.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards generating Kubernetes objects (such as Kubernetes Ingress objects and/or Kubernetes Custom Resource Definition (CRD) objects) based on template object files and based on network security policies.

A computing device may receive a template object file. The template object file may comprise a format for one or both of: a Kubernetes Ingress object, or a Kubernetes Custom Resource Definition (CRD). The template object file may additionally and/or alternatively comprise a template identifier. The computing device may receive an indication of a network security policy. The computing device may identify a Kubernetes service object that comprises the template identifier. The computing device may generate, based on the template object file and based on the network security policy, a new Kubernetes object that comprises one or both of: a new Kubernetes Ingress object for the Kubernetes service object, or a new CRD for the Kubernetes service object. The new Kubernetes Ingress object may be configured to manage, based on the network security policy, input to the Kubernetes service object. The new CRD may comprises one or more Internet Protocol (IP) addresses indicated by the network security policy, and the Kubernetes service object may be configured to prevent communications, from the one or more IP addresses, to the Kubernetes service object. The computing device may store the new Kubernetes object.

The new Kubernetes object may be configured to implement one or more aspects of the network security policy. For example, the network security policy may specify a blocklist. In such a circumstance, the new Kubernetes object may be configured to filter traffic associated with the blocklist.

The generation of the new Kubernetes object may be based on changes to a network security policy. For example, the computing device may retrieve the indication of the network security policy based on detecting a change to the network security policy. In such a circumstance, the computing device may generate the new Kubernetes object based on detecting the change to the network security policy.

New Kubernetes object(s) may be re-generated, deleted, or otherwise modified based on changes to the network security policy, the template object file, or other Kubernetes objects. For example, the computing device may detect a change to the template object file. In such a circumstance, the computing device may generate, based on the change to the template object file, a second new Kubernetes object and replace the new Kubernetes object with a second new Kubernetes object. As another example, the computing device may detect a deletion of the Kubernetes service object; and delete one or more of: the new Kubernetes Ingress object, or the new CRD.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 6 is an illustrative flowchart comprising steps for generating new Kubernetes objects based on a template object file and a network security policy.

FIG. 9 is an example of a Kubernetes Ingress template object.

FIG. 10 is an example of a Kubernetes service object.

FIG. 11 is an example of a Kubernetes ingress object.

FIG. 12 is an example of a Kubernetes custom resource definition template object.

FIG. 13 is an example of a Kubernetes service object.

FIG. 14 is an example of a Kubernetes custom resource definition object.

DETAILED DESCRIPTION

Figure 1:
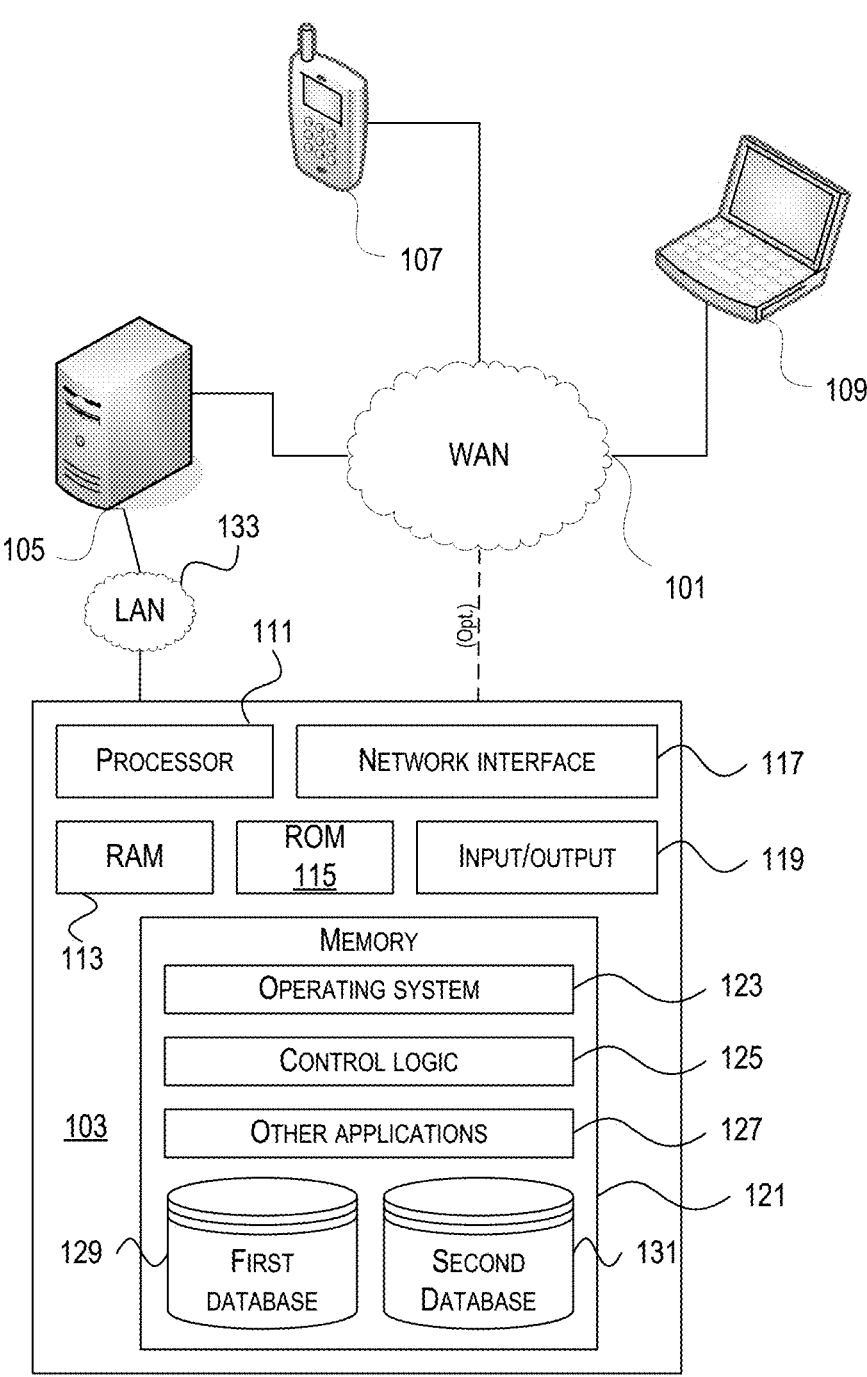
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards generating Kubernetes objects in a manner which allows the rapid implementation of network security policies to those objects. As useful as Kubernetes can be, the containerized nature of applications run in Kubernetes clusters can present network security issues. For example, a developer may program a containerized application that is configured to receive various forms of network traffic. Because the containerized application may receive network traffic, it may be desirable to protect the containerized application from malicious actors by, for example, blocking certain forms of traffic from being received by the containerized application. That said, to implement a blocklist (or a similar set of filtering rules), a developer may be forced to periodically re-program the containerized application (by, e.g., re-containerizing an application with a new list of blocked Internet Protocol (IP) addresses). This process can be unnecessarily arduous and time-consuming. As a result, containerized applications might not be updated as frequently as network security policies are, resulting in significant network security vulnerabilities. For example, to implement a new IP blocklist for existing containerized applications, a developer may be required to manually re-package the application with the new IP blocklist. That process might be so arduous that it might not be feasible for it to be performed on a daily basis, let alone a monthly basis. In other words, the requirement that Kubernetes containerized applications must be manually updated based on changes to network security policies can significantly impede (e.g., delay) the implementation of security policies, which can introduce security vulnerabilities.

Aspects described herein address those and other issues by using templates to generate, based on security policies, Kubernetes objects such as Kubernetes Ingress objects and/or Kubernetes custom resource definitions. In this manner, developers need only develop a template, and that template can be used on an ongoing basis to generate Kubernetes objects which implement changes in security policies. As such, Kubernetes objects may be rapidly deployed based on security policy changes, significantly improving the speed and flexibility of the Kubernetes environment.

Aspects described herein improve the functioning of computers by providing a specific improvement to the network security of a particular type of computing environment. For instance, aspects described herein focus on unique computing environments that implement the Kubernetes system. Given the special implementation of computing devices involved in the present disclosure, aspects described herein could not be performed by a human being and/or with pencil or paper. Indeed, the steps described herein are specifically designed to avoid a circumstance where human intervention is required to update containerized applications.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
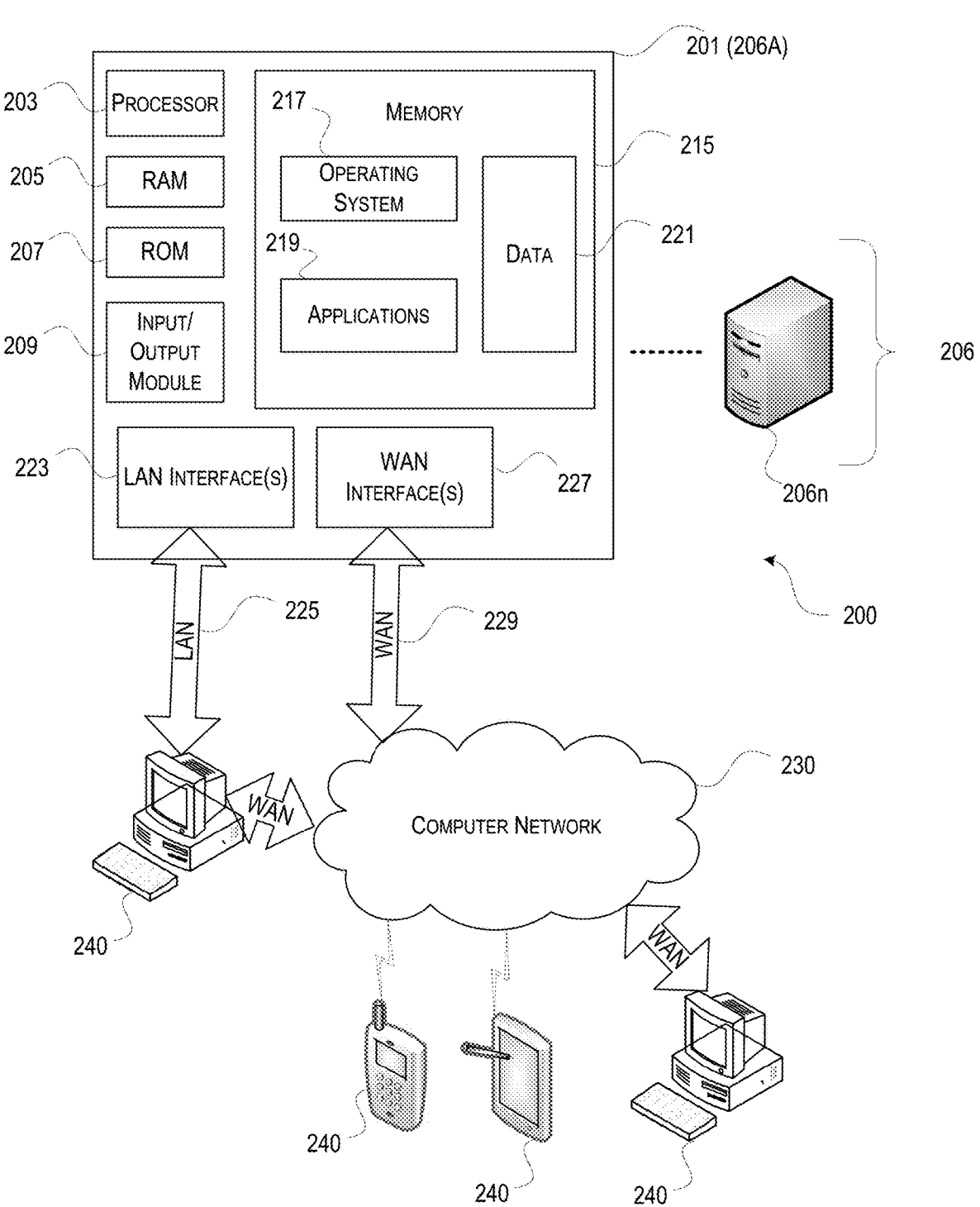
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
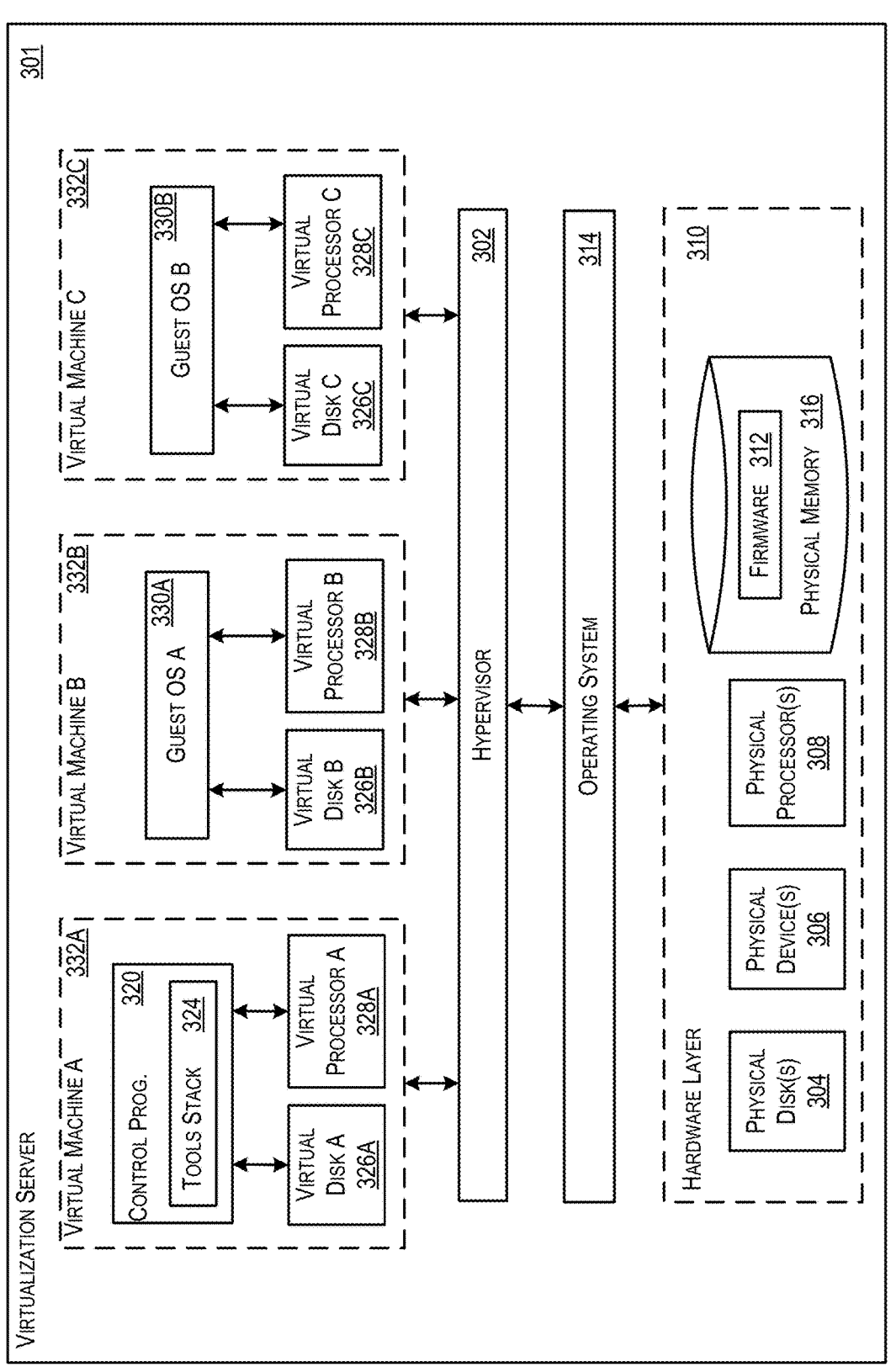
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, Virtual-Server or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332.

In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Generation of Kubernetes Objects

Figure 4:
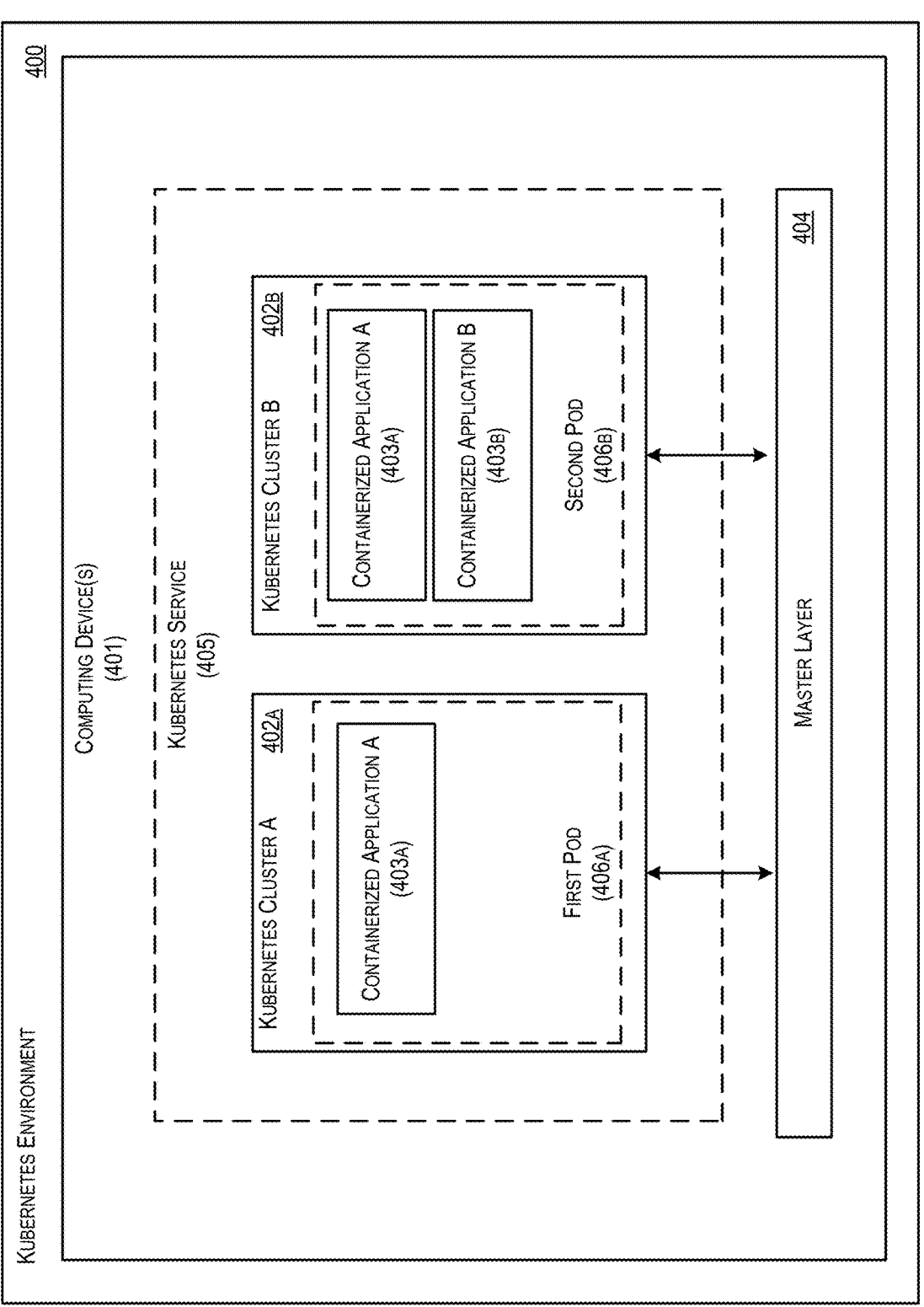
FIG. 4 depicts an illustrative Kubernetes environment.

FIG. 4 depicts a Kubernetes environment 400 that executes on one or more computing devices 401. The computing devices 401 may be one or more of the devices described in FIG. 1 and/or FIG. 2. Additionally and/or alternatively, the computing devices 401 may comprise one or more virtual machines, such as those discussed in FIG. 3. The Kubernetes environment 400 is shown as providing a Kubernetes service 405 that comprises two clusters: a Kubernetes cluster A 402a, and a Kubernetes cluster B 402b. The Kubernetes cluster A 402a is shown executing a first pod 406a that comprises a containerized application A 403a. The Kubernetes cluster B 402b is shown executing a second pod 406b that comprises two containerized applications: the containerized application A, and a containerized application B 403b. The Kubernetes cluster A 402a and the Kubernetes cluster B 402b are shown as managed by a master layer 404. The Kubernetes environment 400 shown in FIG. 4 is simplified for the purposes of illustration, and further division and/or segregation of elements may be performed.

A Kubernetes service, such as the Kubernetes service 405, may be an abstraction which defines a logical set of pods, such as the first pod 406a and/or the second pod 406b. From a user-facing perspective, the Kubernetes service 405 may be perceived as the same service, such that different containerized applications may reflect different aspects of that service. In this way, Kubernetes advantageously allows organizations to divide up various aspects of the same service into discrete/containerized applications.

Kubernetes clusters, such as the Kubernetes cluster A 402a and the Kubernetes cluster B 402b, may refer to one or more worker machines (referred to in Kubernetes as nodes) that execute one or more containerized applications. The worker machines may be, for example, one or more of the computing devices 401. As such, the clusters may be viewed as computing resources which may be used to execute one or more Kubernetes pods (and, in turn, one or more containerized applications).

Kubernetes pods, such as the first pod 406a and/or the second pod 406b, may correspond to the smallest deployable computing units that may be managed in Kubernetes. A pod may comprise one or more containerized applications. By way of example, as shown in FIG. 4, the first pod 406a is associated with one containerized application, whereas the second pod 406b is associated with two containerized applications. Thus, for example, the first pod 406a may be deployed on a variety of different Kubernetes clusters, which may cause that variety of clusters to execute the containerized application A 403a.

The master layer 404 may be configured to manage the computing devices 401, pods (e.g., the first pod 406a and/or the second pod 406b), Kubernetes clusters (e.g., the Kubernetes cluster A 402a and the Kubernetes cluster B 402b), and/or containerized applications (e.g., the containerized application A 403a and/or the containerized application B 403b). In this manner, the master layer 404 may implement, for example, application and/or cluster redundancy.

As one example of how FIG. 4 might be implemented, the Kubernetes service 405 may correspond to a web server service, such as a service which provides HyperText Markup Language (HTML) content to web browsers. The containerized application A 403a may correspond to a PHP: Hypertext Processor (PHP) server, whereas the containerized application B 403*b* may correspond to a Structured Query Language (SQL) database server. The Kubernetes cluster A 402*a* may be a cluster associated with a portion of the computing devices 401 in Europe, whereas the Kubernetes cluster B 402*b* may be a cluster associated with a portion of the computing devices 401 in the United States. Should the Kubernetes cluster A 402*a* fail (e.g., due to a failure by one or more of the computing devices 401), the master layer 404 may re-deploy the first pod 406*a* to another one of the computing devices 401 by, e.g., instantiating a new Kubernetes cluster. In this manner, the configuration of clusters in the Kubernetes service 405 may geolocate containerized applications close to users while simultaneously providing a form of fault protection.

Figure 5:
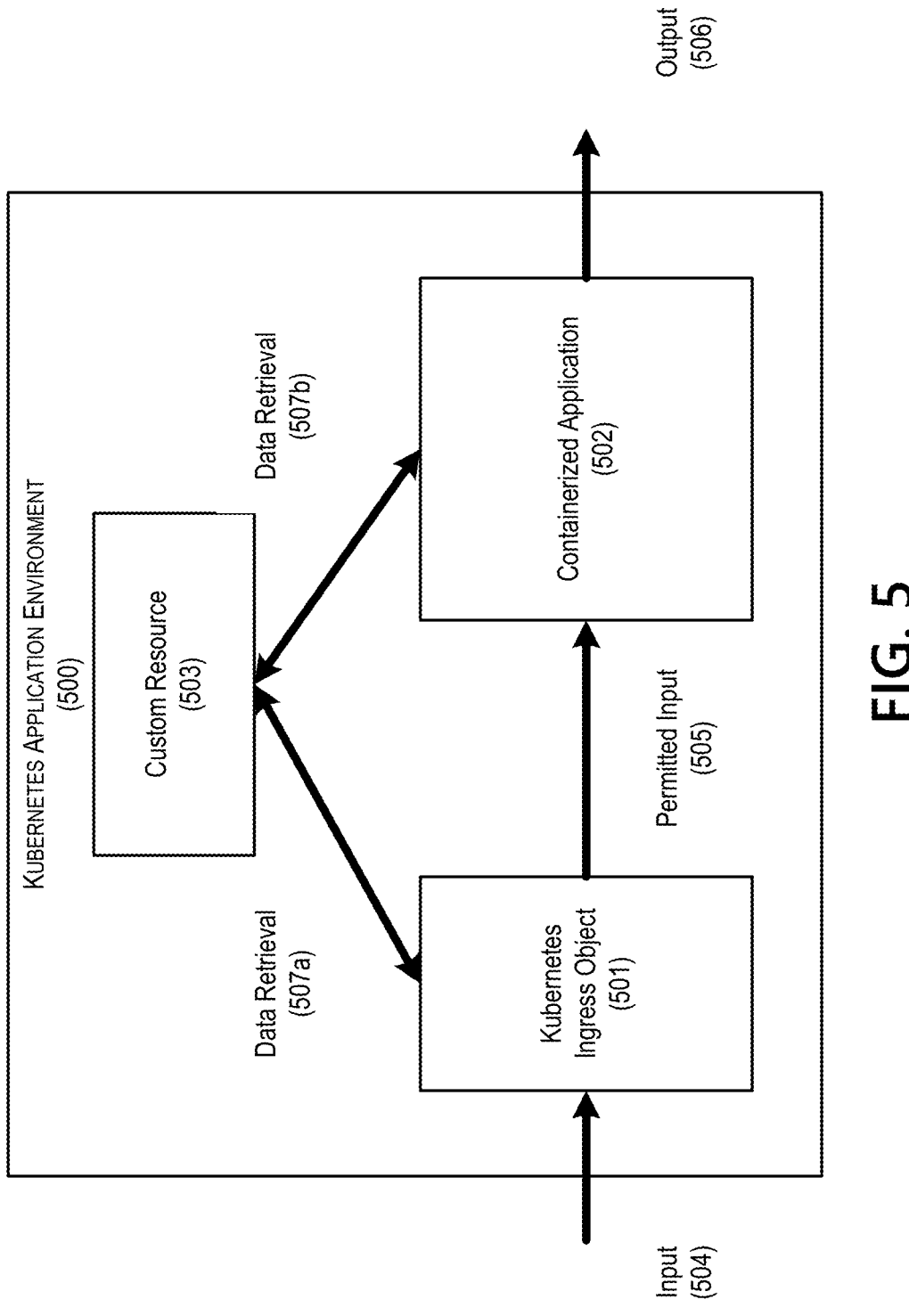
FIG. 5 depicts an illustrative Kubernetes service.

FIG. 5 illustrates aspects of a Kubernetes application environment 500. More particularly, FIG. 5 shows that a containerized application 502 may have its input managed by an Ingress object 501 and may have access to custom resources such as a custom resource 503. FIG. 5 is merely illustrative, and provides a high-level representation of how a containerized application may receive input, provide output, and access custom resources. In practice, the actual implementation of various containerized applications may be slightly different and/or significantly more complicated.

As shown in FIG. 5, input 504 may be received and intended for the containerized application 502. That said, before the input 504 is actually received by the containerized application 502, it may be processed by the Ingress object 501. The Ingress object 501 may be configured to manage external access to one or more aspects of a Kubernetes system. For example, the Ingress object 501 shown in FIG. 5 may manage access to the containerized application 502. In some instances, the Ingress object 501 may additionally and/or alternatively manage such external access to one or more clusters, one or more services, and/or one or more pods. As part of managing external access to the containerized application 502, the Ingress object 501 may, for example, modify the input 504 to, for example, confirm the input with a format that may be understood by the containerized application 502, remove malformed data in the input 504, block unauthorized access to the containerized application 502, or the like. All or portions of the input 504 may then be forwarded, as permitted input 505 and from the Ingress object 501, to the containerized application 502.

The containerized application 502 and/or the Ingress object 501 may access one or more custom resources, such as the custom resource 503. A custom resource may be an extension of Kubernetes, such that custom resources may add new content (e.g., new functionality, new data) to a Kubernetes environment. Such custom resources may be defined by a custom resource definition (CRD), which may define one or more aspects of the custom resource, such as a name and a schema. The containerized application 502 may access, via data retrieval 507*b*, the custom resource 503 during execution. For example, the custom resource 503 may define one or more rules that limit execution of the containerized application 502. Additionally and/or alternatively, the Ingress object 501 may access, via data retrieval 507*a*, the custom resource 503 during execution. For example, the custom resource 503 may define one or more IP addresses which may be blocked by the Ingress object 501.

Output 506 may represent output from the containerized application 502. Such output may depend on the nature of the containerized application 502. For example, if the containerized application 502 is a web service, then the output may comprise website information.

Figure 6:
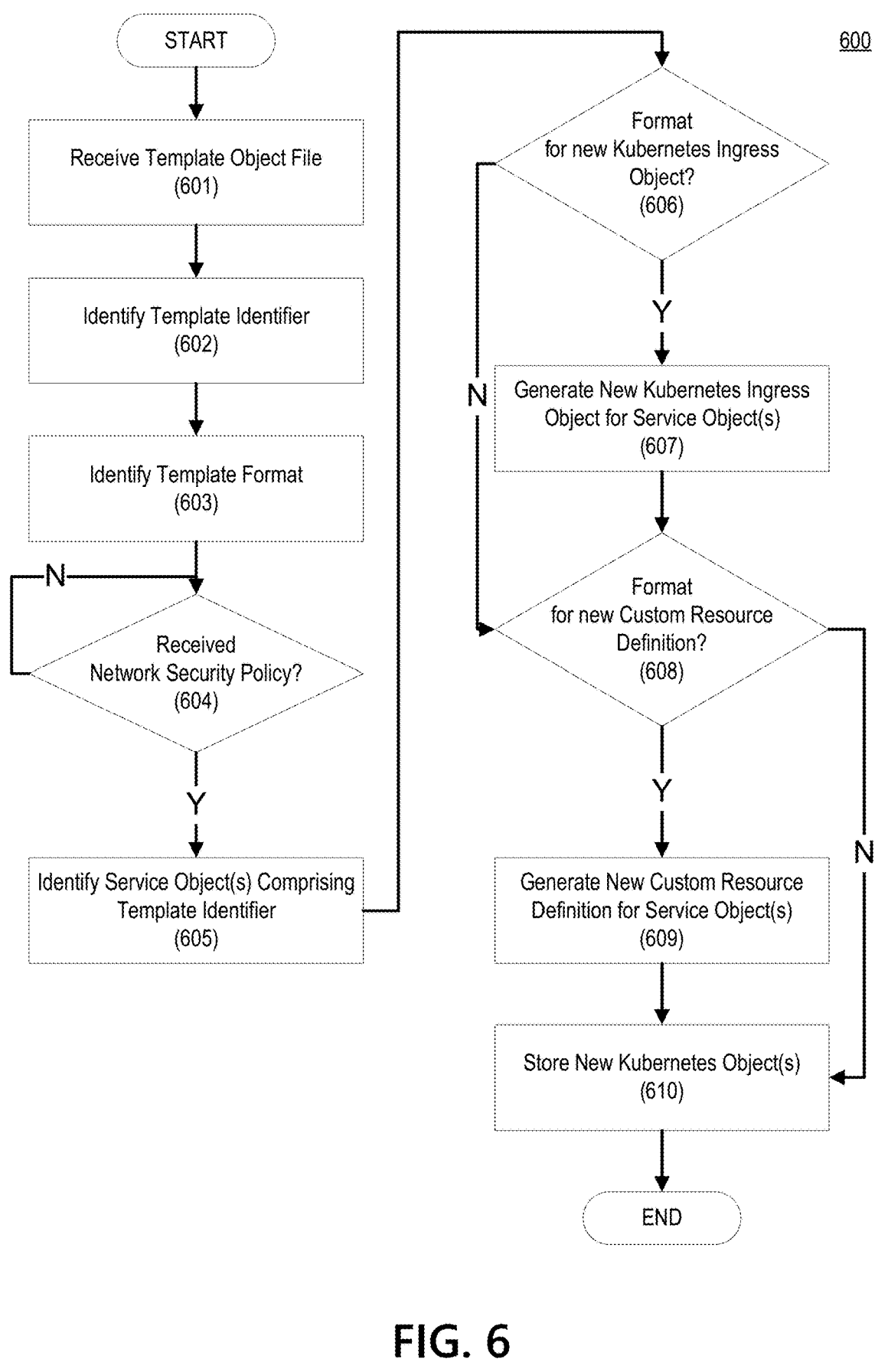

FIG. 6 depicts a flowchart 600 comprising steps which may be performed to generate a Kubernetes object. The steps depicted in FIG. 6 may be performed by any one of the computing devices described with respect to FIG. 1, FIG. 2, and/or FIG. 3. For example, all or portions of the steps depicted in FIG. 6 may be performed by a virtual machine on a computing device. A computing device may comprise one or more processors and memory storing instructions that, when executed by the one or more processors, cause the computing device to perform one or more of the steps of FIG. 6. One or more non-transitory computer-readable media may store instructions that, when executed by the one or more processors of a computing device, cause performance of one or more of the steps of FIG. 6. The steps depicted in FIG. 6 are illustrative, and may be re-arranged, omitted, and/or otherwise modified as desired. For example, in some circumstances, step 602 and/or step 603 may be omitted.

In step 601, a computing device may receive a template object file. The template object file may specify a format (e.g., a schema) for one or both of a new Kubernetes object, such as a Kubernetes Ingress object and/or a Kubernetes Custom Resource Definition (CRD). The format may comprise instructions for generating a Kubernetes Ingress object and/or CRD for one or more containerized applications which provide a Kubernetes service. In this manner, a developer may design the format such that the format may be used to generate (e.g., automatically and/or programmatically generate) a new Kubernetes object which is compatible with, e.g., existing Kubernetes services (e.g., one or more containerized applications executing in a Kubernetes system). The template object file may additionally and/or alternatively comprise a template identifier. As will be described in further detail below, the template identifier may be used to identify which containerized applications (e.g., Kubernetes services) the template object file corresponds to. As such, as part of step 601, the computing device may receive a template object file comprising a format for one or both of: a Kubernetes Ingress object, or a Kubernetes Custom Resource Definition (CRD); and a template identifier. Examples of template object files are provided in FIG. 9 and FIG. 12.

In step 602, the computing device may identify a template identifier. A template identifier may be any identifier in the template object file which may also be placed in one or more existing Kubernetes objects (e.g., Kubernetes services, containerized applications, or the like) to associate the two together. In this manner, when a new Kubernetes object is generated using the template object file, the new Kubernetes object may be associated with the existing Kubernetes objects having the same or a similar template identifier. This association is discussed in more detail below with respect to step 605. Examples of such template identifiers are provided below with respect to FIG. 9 and FIG. 12.

In step 603, the computing device may identify a template format. As indicated above, a template format may comprise instructions for generating a new Kubernetes object which is compatible with, e.g., existing Kubernetes services (e.g., one or more containerized applications executing in a Kubernetes system). As such, a computing device may use the template format to generate a new Kubernetes Ingress object and/or CRD that is compatible with existing Kubernetes objects.

In step 604, the computing device may determine whether it has received (or may receive) a network security policy. For example, the computing device may receive an indication of a network security policy. If the computing device has not received a network security policy, the computing device may continue to wait (e.g., loop) until a network security policy is received (and/or available for receipt). If the computing device has received a network security policy, the flowchart 600 proceeds to step 605.

A network security policy may be any set of rules, restrictions, or similar data which may specify how security should be implemented with respect to a network. For example, the network security policy may comprise a plurality of IP addresses or other similar identifiers. In this manner, the network security policy may specify how Kubernetes services should be executed, and/or how Kubernetes services should receive input and/or provide output. For example, a network security policy may indicate that one or more IP addresses should be blocked. As another example, a network security policy may indicate that a particular containerized application should not transmit output to a particular IP address. As yet another example, a network security policy may indicate that a containerized application should not permit use of passwords less than four alphanumeric characters long.

Determining whether a network security policy has been received may be based on detecting a change to an existing network security policy. Because network security policies may change rapidly (e.g., every day, every hour), it may be desirable to generate new Kubernetes objects based on changes to the network security policy. In this manner, the computing device may ensure that the Kubernetes system is well-protected from, e.g., evolving threats. As such, the computing device may periodically monitor the status of an existing network security policy, then receive (e.g., retrieve) the network security policy responsive to detecting a change in the existing network security policy. For example, the computing device may detect a change to a network security policy based on one or more additions to, revisions to, and/or changes to one or more files associated with the network security policy.

The network security policy may specify a blocklist. In this manner, the network security policy may comprise a list of IP addresses for which input should not be received by all or portions of a Kubernetes service. For example, the network security policy may comprise a list of IP addresses which are to be locked from accessing a containerized application.

In step 605, the computing device may identify Kubernetes service objects comprising the template identifier. As indicated above, the template identifier in the template object file may be an arbitrary string or other identifier which may connect the template object file to one or more existing Kubernetes service objects. As such, as part of step 605, the computing device may search for one or more Kubernetes service objects that comprise all or portions of the template identifier from the template object file. For example, the computing device may identify a Kubernetes service object that comprises the template identifier. Examples of such service objects are provided in FIG. 10 and FIG. 13.

The Kubernetes service objects identified in step 605 may comprise one or more clusters, pods, containerized applications, nodes, or portions thereof. In this manner, a wide variety of different elements of a Kubernetes system may comprise all or portions of the template identifier, and thus may be involved in the generation of a new Kubernetes object (as discussed below).

Step 606 through step 609 begin a process whereby one or more new Kubernetes objects (e.g., Kubernetes Ingress object(s) and/or CRDs) may be generated. For example, the computing device may generate, based on the template object file and based on the network security policy, a new Kubernetes object that comprises one or both of: a new Kubernetes Ingress object for the Kubernetes service object, or a new CRD for the Kubernetes service object. Such steps may be performed based on detecting a change to a network security policy. For example, based on a network administrator adding a new IP address to a blocklist in a network security policy, step 606 through step 609 may be performed. Examples of such new Kubernetes objects are provided in FIG. 11 and FIG. 14.

In step 606, the computing device may determine whether the template format of the template object file corresponds to a Kubernetes Ingress object. The template format identified in step 603 may correspond to one or more particular types of Kubernetes object. One such type of Kubernetes object is a Kubernetes Ingress object. If the template format of the template object file corresponds to a Kubernetes Ingress object, the flowchart 600 may proceed to step 607. Otherwise, the flowchart 600 may proceed to step 608.

In step 607, the computing device may generate a new Kubernetes Ingress object for the identified Kubernetes service object(s). The new Kubernetes Ingress object may be configured to manage external access to one or more aspects of a Kubernetes service, such as one or more clusters, pods, containerized applications, or the like. With respect to the network security policy, the new Kubernetes Ingress object may be configured to manage external access to the one or more aspects of the Kubernetes service based on the network security policy. For example, if the network security policy comprises a blocklist, then the new Kubernetes Ingress object may be configured to prevent access, to the Kubernetes service, based on the blocklist. As another example, if the network security policy defines types of unsafe communications, then the new Kubernetes Ingress object may be configured to block those types of unsafe communications.

In step 608, the computing device may determine whether the template format of the template object file corresponds to a CRD. A custom resource definition is another example of a type of new Kubernetes object that may be generated based on the network security policy. If the template format of the template object file corresponds to a custom resource definition, then the flowchart 600 may proceed to step 609. Otherwise, the flowchart 600 may proceed to step 610.

In step 609, the computing device may generate a new CRD for the Kubernetes service object(s). The new CRD may comprise all or portions of the network security policy. For example, if the network security policy comprises one or more rules for the execution of applications, then the custom resource definition may store all or portions of those rules such that executing containerized applications may reference those rules in the Kubernetes system.

The new CRD may comprise one or more Internet Protocol (IP) addresses indicated by the network security policy. For example, the network security policy may comprise a list of one or more untrusted IP addresses. That list may be stored in the new custom resource definition. In turn, the Kubernetes service object (e.g., an existing Kubernetes Ingress object, a containerized application, or the like) may be configured to prevent communications, from the one or more IP addresses, to the Kubernetes service object.

In step 610, the computing device may store the new Kubernetes object(s) (e.g., the new Kubernetes Ingress object and/or the custom resource definition). The computing device may store the new Kubernetes object(s) in database, such as a database associated with the Kubernetes service objects identified in step 605.

Figure 7:
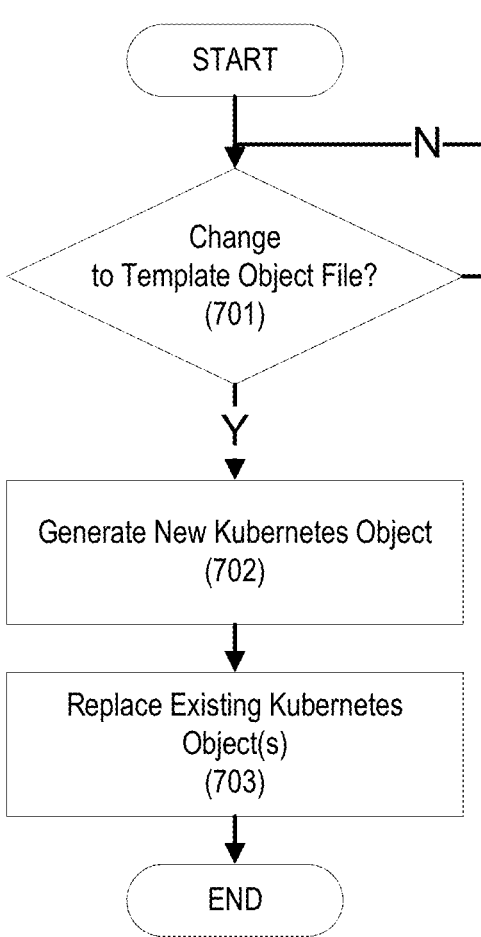
FIG. 7 is an illustrative flowchart comprising steps for replacing existing Kubernetes objects based on changes to a template object file.
Figure 8:
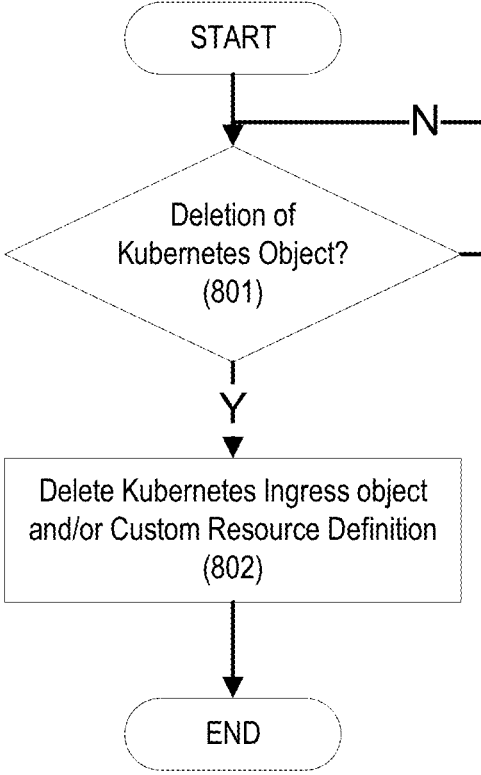
FIG. 8 is an illustrative flowchart comprising steps for handling the deletion of a Kubernetes object.

As an introduction to FIG. 7 and FIG. 8, the ability to automatically generate and thereby deploy new Kubernetes objects based on network security policies might mean that those same Kubernetes objects be updated and/or deleted. For example, if the template object file is changed, then Kubernetes objects generated based on that template object file may also be generated again to account for the change(s) in the template object file. As another example, if one or more containerized applications are deleted and/or otherwise removed, then automatically-generated Kubernetes objects corresponding to those one or more containerized applications should also be deleted and/or otherwise removed.

FIG. 7 depicts a flowchart 700 comprising steps which may be performed to replace existing Kubernetes objects. The steps depicted in FIG. 7 may be performed by any one of the computing devices described with respect to FIG. 1, FIG. 2, and/or FIG. 3. For example, all or portions of the steps depicted in FIG. 7 may be performed by a virtual machine on a computing device. A computing device may comprise one or more processors and memory storing instructions that, when executed by the one or more processors, cause the computing device to perform one or more of the steps of FIG. 7. One or more non-transitory computer-readable media may store instructions that, when executed by the one or more processors of a computing device, cause performance of one or more of the steps of FIG. 7. The steps depicted in FIG. 7 are illustrative, and may be re-arranged, omitted, and/or otherwise modified as desired.

In step 701, a computing device may determine whether there has been a change to a template object file. For example, the computing device may detect a change to the template object file. A change to the template object file may comprise any change to, e.g., the code of the template object file. The computing device may determine that a change has been made to a template object file by periodically monitoring the template object file, by analyzing metadata associated with the template object file (e.g., a last modified value corresponding to the template object file), or the like. If no change has been made to the template object file, the computing device continues to wait (e.g., loops). If a change has been made, the flowchart 700 proceeds to step 702.

In step 702, the computing device may generate a new Kubernetes object. The new Kubernetes object may be based on the new (e.g., the changed) template object file. For example, the computing device may generate, based on the change to the template object file, a second new Kubernetes object. In this manner, the new Kubernetes object may reflect any changes made to the template object file.

In step 703, the computing device may replace one or more existing Kubernetes objects with the new Kubernetes object generated in step 702. For example, the computing device may replace the new Kubernetes object with a second new Kubernetes object. In this manner, the Kubernetes object may be kept updated in a manner which reflects updates to the template object file.

FIG. 8 depicts a flowchart 800 comprising steps which may be performed to replace existing Kubernetes objects. The steps depicted in FIG. 8 may be performed by any one of the computing devices described with respect to FIG. 1, FIG. 2, and/or FIG. 3. For example, all or portions of the steps depicted in FIG. 8 may be performed by a virtual machine on a computing device. A computing device may comprise one or more processors and memory storing instructions that, when executed by the one or more processors, cause the computing device to perform one or more of the steps of FIG. 8. One or more non-transitory computer-readable media may store instructions that, when executed by the one or more processors of a computing device, cause performance of one or more of the steps of FIG. 8. The steps depicted in FIG. 8 are illustrative, and may be re-arranged, omitted, and/or otherwise modified as desired.

In step 801, a computing device may determine whether a Kubernetes object has been deleted. For example, the computing device may detect a deletion of the Kubernetes service object. The computing device may detect the deletion of a Kubernetes object based on monitoring one or more files associated with the Kubernetes object. For example, the computing device may determine that a Kubernetes object has been deleted if all or portions of code associated with that object have been deleted. If the computing device does not detect the deletion of a Kubernetes object, the computing device continues to wait (e.g., loops). If the computing device detects the deletion of a Kubernetes object, the flowchart 800 proceeds to step 802.

In step 802, the computing device delete a Kubernetes Ingress object and/or a custom resource definition corresponding to the deleted Kubernetes object detected in step 801. For example, the computing device may delete one or more of: a new Kubernetes Ingress object, or a new CRD. In this manner, the computing device may, in effect, clean up automatically generated Kubernetes objects that correspond to the deleted Kubernetes object referenced in step 801. Should such a Kubernetes object later be re-added to the Kubernetes system, then this deletion need not be disastrous: the computing device could simply perform all or portions of the steps of FIG. 6 to re-generate various Kubernetes objects.

FIGS. 9-14 provide various examples of different Kubernetes objects, such as template objects, service objects, Ingress objects, and custom resource definitions.

FIGS. 9-11 relate to the generation of a new Kubernetes Ingress object. FIG. 9 depicts a Kubernetes Ingress template object 900. The template identifier in this example is specified by the field "com.organization.ingress: <value>." The example depicted in FIG. 9 also provides other details such as a secret value and an insecure port number. FIG. 10 depicts a Kubernetes service object 1000. The template identifier in this example is specified by the field "com.organization.ingress: <value>." FIG. 11 depicts a Kubernetes Ingress object 1100 that has been generated, based on the Kubernetes Ingress template object 900, for the Kubernetes service object 1000.

FIGS. 12-14 relate to the generation of a new Kubernetes custom resource definition. FIG. 12 depicts a Kubernetes custom resource definition template object 1200. The template identifier in this example is specified by the field "com.organization.crd: <value>." The example also indicates that the name of the custom resource definition is "allowipstemplate." FIG. 13 depicts a Kubernetes service object 1300. The template identifier in this example is specified by the field "com.organization.crd: <value>." FIG. 14 depicts a Kubernetes custom resource definition 1400 that has been generated, based on the Kubernetes custom resource definition template object 1200, for the Kubernetes service object 1300.

The following paragraphs (M1) through (M7) describe examples of methods that may be implemented in accordance with the present disclosure.

(M1) A method comprising: receiving, by a computing device, a template object file comprising: a format for one or both of: a Kubernetes Ingress object, or a Kubernetes Custom Resource Definition (CRD); and a template identifier; receiving, by the computing device, an indication of a network security policy; identifying, by the computing device, a Kubernetes service object that comprises the template identifier; generating, by the computing device, based on the template object file, and based on the network security policy, a new Kubernetes object that comprises one or both of: a new Kubernetes Ingress object for the Kubernetes service object, or a new CRD for the Kubernetes service object; and storing, by the computing device, the new Kubernetes object.

(M2) A method may be performed as described in paragraph (M1), wherein the new Kubernetes Ingress object is configured to manage, based on the network security policy, input to the Kubernetes service object.

(M3) A method may be performed as described in any one of paragraphs (M1)-(M2), wherein the new CRD comprises one or more Internet Protocol (IP) addresses indicated by the network security policy, and wherein the Kubernetes service object is configured to prevent communications, from the one or more IP addresses, to the Kubernetes service object.

(M4) A method may be performed as described in any one of paragraphs (M1)-(M3), wherein retrieving the indication of the network security policy is based on detecting a change to the network security policy, and wherein generating the new Kubernetes object is based on detecting the change to the network security policy.

(M5) A method may be performed as described in any one of paragraphs (M1)-(M4), further comprising: detecting a change to the template object file; generating, based on the change to the template object file, a second new Kubernetes object; and replacing the new Kubernetes object with a second new Kubernetes object.

(M6) A method may be performed as described in any one of paragraphs (M1)-(M5), further comprising: detecting a deletion of the Kubernetes service object; and deleting one or more of: the new Kubernetes Ingress object, or the new CRD.

(M7) A method may be performed as described in any one of paragraphs (M1)-(M6), wherein the network security policy specifies a blocklist, and wherein the new Kubernetes object is configured to filter traffic associated with the blocklist.

The following paragraphs (A1) through (A7) describe examples of apparatuses that may be implemented in accordance with the present disclosure.

(A1) A computing device comprising: one or more processors; and memory storing instructions that, when executed by the one or more processors, cause the computing device to: receive a template object file comprising: a format for one or both of: a Kubernetes Ingress object, or a Kubernetes Custom Resource Definition (CRD); and a template identifier; receive an indication of a network security policy; identify a Kubernetes service object that comprises the template identifier; generate, based on the template object file and based on the network security policy, a new Kubernetes object that comprises one or both of: a new Kubernetes Ingress object for the Kubernetes service object, or a new CRD for the Kubernetes service object; and store the new Kubernetes object.

(A2) A computing device as described in paragraph (A1), wherein the new Kubernetes Ingress object is configured to manage, based on the network security policy, input to the Kubernetes service object.

(A3) A computing device as described in any one of paragraphs (A1)-(A2), wherein the new CRD comprises one or more Internet Protocol (IP) addresses indicated by the network security policy, and wherein the Kubernetes service object is configured to prevent communications, from the one or more IP addresses, to the Kubernetes service object.

(A4) A computing device as described in any one of paragraphs (A1)-(A3), wherein the instructions, when executed by the one or more processors, cause the computing device to retrieve the indication of the network security policy based on detecting a change to the network security policy, and wherein the instructions, when executed by the one or more processors, cause the computing device to generate the new Kubernetes object based on detecting the change to the network security policy.

(A5) A computing device as described in any one of paragraphs (A1)-(A4), wherein the instructions, when executed by the one or more processors, further cause the computing device to: detect a change to the template object file; generate, based on the change to the template object file, a second new Kubernetes object; and replace the new Kubernetes object with a second new Kubernetes object.

(A6) A computing device as described in any one of paragraphs (A1)-(A5), wherein the instructions, when executed by the one or more processors, further cause the computing device to: detect a deletion of the Kubernetes service object; and delete one or more of: the new Kubernetes Ingress object, or the new CRD.

(A7) A computing device as described in any one of paragraphs (A1)-(A6), wherein the network security policy specifies a blocklist, and wherein the new Kubernetes object is configured to filter traffic associated with the blocklist.

The following paragraphs (CRM1) through (CRM7) describe examples of computer-readable media that may be implemented in accordance with the present disclosure.

(CRM1) One or more non-transitory computer-readable media storing instructions that, when executed by one or more processors of a computing device, cause the computing device to: receive a template object file comprising: a format for one or both of: a Kubernetes Ingress object, or a Kubernetes Custom Resource Definition (CRD); and a template identifier; receive an indication of a network security policy; identify a Kubernetes service object that comprises the template identifier; generate, based on the template object file and based on the network security policy, a new Kubernetes object that comprises one or both of: a new Kubernetes Ingress object for the Kubernetes service object, or a new CRD for the Kubernetes service object; and store the new Kubernetes object.

(CRM2) One or more non-transitory computer-readable media as described in paragraph (CRM1), wherein the new Kubernetes Ingress object is configured to manage, based on the network security policy, input to the Kubernetes service object.

(CRM3) One or more non-transitory computer-readable media as described in any one of paragraphs (CRM1)-(CRM2), wherein the new CRD comprises one or more Internet Protocol (IP) addresses indicated by the network security policy, and wherein the Kubernetes service object is configured to prevent communications, from the one or more IP addresses, to the Kubernetes service object.

(CRM4) One or more non-transitory computer-readable media as described in any one of paragraphs (CRM1)-

(CRM3), wherein the instructions, when executed by the one or more processors, cause the computing device to retrieve the indication of the network security policy based on detecting a change to the network security policy, and wherein the instructions, when executed by the one or more processors, cause the computing device to generate the new Kubernetes object based on detecting the change to the network security policy.

(CRM5) One or more non-transitory computer-readable media as described in any one of paragraphs (CRM1)-(CRM4), wherein the instructions, when executed by the one or more processors, further cause the computing device to: detect a change to the template object file; generate, based on the change to the template object file, a second new Kubernetes object; and replace the new Kubernetes object with a second new Kubernetes object.

(CRM6) One or more non-transitory computer-readable media as described in any one of paragraphs (CRM1)-(CRM5), wherein the instructions, when executed by the one or more processors, further cause the computing device to: detect a deletion of the Kubernetes service object; and delete one or more of: the new Kubernetes Ingress object, or the new CRD.

(CRM7) One or more non-transitory computer-readable media as described in any one of paragraphs (CRM1)-(CRM6), wherein the network security policy specifies a blocklist, and wherein the new Kubernetes object is configured to filter traffic associated with the blocklist.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device comprising:
one or more processors; and
memory storing instructions that, when executed by the one or more processors, cause the computing device to:
    receive a template object file comprising:
        a format for both of:
            a Kubernetes Ingress object,
            a Kubernetes Custom Resource Definition (CRD); and
        a template identifier;
    receive an indication of a network security policy;
    identify a Kubernetes service object that comprises the template identifier; generate,
    based on the template object file and based on the network security policy, a new Kubernetes object wherein:
        the template object file defines structural parameters and placeholders to be populated;
        the network security policy defines dynamic rules for access control and traffic filtering; and
    the new Kubernetes object comprises:
        a new Kubernetes Ingress object for the Kubernetes service object, and
        a new CRD for the Kubernetes service object; and
    store the newly generated Kubernetes object in a Kubernetes-accessible data store for deployment;
        wherein the newly generated CRD comprises one or more programmatically-inserted Internet Protocol (IP) addresses indicated by the network security policy, and wherein the Kubernetes service object is configured with an IP blocklist to prevent communications, from the one or more IP addresses to the Kubernetes service object.

2. The computing device of claim 1, wherein the new Kubernetes Ingress object is configured to manage, based on the network security policy, input to the Kubernetes service object.

3. The computing device of claim 1, wherein the instructions, when executed by the one or more processors, cause the computing device to retrieve the indication of the network security policy based on detecting a change to the network security policy, and wherein the instructions, when executed by the one or more processors, cause the computing device to generate the new Kubernetes object based on detecting the change to the network security policy.

4. The computing device of claim 1, wherein the instructions, when executed by the one or more processors, further cause the computing device to:
    detect a change to the template object file;
    generate, based on the change to the template object file, a second new Kubernetes object; and
    replace the new Kubernetes object with a second new Kubernetes object.

5. The computing device of claim 1, wherein the instructions, when executed by the one or more processors, further cause the computing device to:
    responsive to detecting a deletion of the Kubernetes service object, delete one or more of:
    the new Kubernetes Ingress object, or
    the new CRD.

6. The computing device of claim 1, wherein the network security policy specifies a blocklist, and wherein the newly generated Kubernetes object is configured to filter traffic associated with the blocklist.

7. A method comprising:
    receiving, by a computing device, a template object file comprising:
        a format for both of:
            a Kubernetes Ingress object,
            a Kubernetes Custom Resource Definition (CRD); and
        a template identifier;
    receiving, by the computing device, an indication of a network security policy; identifying, by the computing device, a Kubernetes service object that comprises the template identifier;
    generating, by the computing device, based on the template object file, and based on the network security policy, a new Kubernetes object wherein:
        the template object file defines structural parameters and placeholders to be populated;
        the network security policy defines dynamic rules for access control and traffic filtering; and
        the new Kubernetes object comprises:
            a new Kubernetes Ingress object for the Kubernetes service object, and
            a new CRD for the Kubernetes service object; and
    storing, by the computing device, the newly generated Kubernetes object in a Kubernetes-accessible data store for deployment;
        wherein the newly generated CRD comprises one or more programmatically-inserted Internet Protocol (IP) addresses indicated by the network security policy, and wherein the Kubernetes service object is configured with an IP blocklist to prevent communications, from the one or more IP addresses to the Kubernetes service object.

8. The method of claim 7, wherein the new Kubernetes Ingress object is configured to manage, based on the network security policy, input to the Kubernetes service object.

9. The method of claim 7, wherein retrieving the indication of the network security policy is based on detecting a change to the network security policy, and wherein generating the new Kubernetes object is based on detecting the change to the network security policy.

10. The method of claim 7, further comprising:

detecting a change to the template object file;

generating, based on the change to the template object file, a second new Kubernetes object; and replacing the new Kubernetes object with a second new Kubernetes object.

11. The method of claim 7, further comprising:

responsive to detecting a deletion of the Kubernetes service object, delete one or more of:

the new Kubernetes Ingress object, or the new CRD.

12. The method of claim 7, wherein the network security policy specifies a blocklist, and wherein the new Kubernetes object is configured to filter traffic associated with the blocklist.

13. One or more non-transitory computer-readable media storing instructions that, when executed by one or more processors of a computing device, cause the computing device to:

receive a template object file comprising:

a format for both of:

a Kubernetes Ingress object, a Kubernetes Custom Resource Definition (CRD); and a template identifier;

receive an indication of a network security policy;

identify a Kubernetes service object that comprises the template identifier;

generate, based on the template object file and based on the network security policy, a new Kubernetes object wherein:

the template object file defines structural parameters and placeholders to be populated;

the network security policy defines dynamic rules for access control and traffic filtering; and the new Kubernetes object comprises:

a new Kubernetes Ingress object for the Kubernetes service object, and a new CRD for the Kubernetes service object; and store the newly generated Kubernetes object in a Kubernetes-accessible data store for deployment;

wherein the newly generated CRD comprises one or more programmatically-inserted Internet Protocol (IP) addresses indicated by the network security policy, and wherein the Kubernetes service object is configured with an IP blocklist to prevent communications, from the one or more IP addresses to the Kubernetes service object.

14. The one or more non-transitory computer-readable media of claim 13, wherein the new Kubernetes Ingress object is configured to manage, based on the network security policy, input to the Kubernetes service object.

15. The one or more non-transitory computer-readable media of claim 13, wherein the instructions, when executed by the one or more processors, cause the computing device to retrieve the indication of the network security policy based on detecting a change to the network security policy, and wherein the instructions, when executed by the one or more processors, cause the computing device to generate the new Kubernetes object based on detecting the change to the network security policy.

16. The one or more non-transitory computer-readable media of claim 13, wherein the instructions, when executed by the one or more processors, further cause the computing device to:

detect a change to the template object file;

generate, based on the change to the template object file, a second new Kubernetes object; and replace the new Kubernetes object with a second new Kubernetes object.

17. The one or more non-transitory computer-readable media of claim 13, wherein the instructions, when executed by the one or more processors, further cause the computing device to:

responsive to detecting a deletion of the Kubernetes service object, delete one or more of:

the new Kubernetes Ingress object, or the new CRD.

* * * * *